United States Patent
Endo et al.

(10) Patent No.: US 7,948,524 B2
(45) Date of Patent: May 24, 2011

(54) IMAGE PROCESSOR AND FACE DETECTOR USING THE SAME

(75) Inventors: Junpei Endo, Hirakata (JP); Motoo Ikari, Kyoto (JP); Satoshi Furukawa, Hirakata (JP); Kenichi Hagio, Toyonaka (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 1195 days.

(21) Appl. No.: 11/097,187

(22) Filed: Apr. 4, 2005

(65) Prior Publication Data
US 2005/0265626 A1  Dec. 1, 2005

(30) Foreign Application Priority Data
May 31, 2004  (JP) ................................. 2004-162349

(51) Int. Cl.
*H04N 5/228* (2006.01)
(52) U.S. Cl. .................. 348/222.1; 348/229.1
(58) Field of Classification Search ............ 348/208.14, 348/154, 155, 86, 125, 152, 223.1, 222.1, 348/229.1; 382/115, 112
See application file for complete search history.

(56) References Cited

U.S. PATENT DOCUMENTS

| | | | |
|---|---|---|---|
| 5,353,058 A * | 10/1994 | Takei | ........................... 348/363 |
| 5,703,644 A | 12/1997 | Mori et al. | |
| 5,802,494 A | 9/1998 | Kuno | |
| 5,880,782 A * | 3/1999 | Koyanagi et al. | ............. 348/364 |
| 6,108,437 A | 8/2000 | Lin | |
| 6,680,745 B2 * | 1/2004 | Center et al. | ................ 348/14.16 |
| 6,882,363 B1 | 4/2005 | Oda et al. | |
| 6,882,741 B2 * | 4/2005 | Dobashi et al. | ................ 382/118 |
| 6,940,545 B1 * | 9/2005 | Ray et al. | .................... 348/222.1 |
| 7,038,715 B1 * | 5/2006 | Flinchbaugh | ............. 348/207.99 |
| 7,298,412 B2 * | 11/2007 | Sannoh et al. | ................. 348/348 |
| 7,330,570 B2 * | 2/2008 | Sogo et al. | ..................... 382/115 |
| 7,440,593 B1 * | 10/2008 | Steinberg et al. | .............. 382/118 |
| 2003/0185424 A1 | 10/2003 | Sato et al. | |
| 2004/0207743 A1 * | 10/2004 | Nozaki et al. | ............. 348/333.12 |

(Continued)

FOREIGN PATENT DOCUMENTS

CN  1159006 A  9/1997

(Continued)

OTHER PUBLICATIONS

EP Search Report dated Oct. 28, 2010 in EP Application No. 05 00 6921.

*Primary Examiner* — Jason Chan
*Assistant Examiner* — Gary C Vieaux
(74) *Attorney, Agent, or Firm* — Oblon, Spivak, McClelland, Maier & Neustadt, L.L.P.

(57) ABSTRACT

An image processor is provided, which has the capability of detecting an object such as a human face from an image taken against the sun with high accuracy. An image signal provided from an image pickup unit is adjusted at an analog gain by an image adjuster. An out of the image adjuster is converted into a digital, and store in a memory. A feature of the object is extracted from this digital image data to detect an object area in the image. When the object area is not detected, an analog-gain controller sends that the image signal provided from the image pickup unit is adjusted at a different analog gain. Thus, the treatment of detecting the object area is repeated at different analog gains.

13 Claims, 9 Drawing Sheets

U.S. PATENT DOCUMENTS

2005/0212913 A1 * 9/2005 Richter .................. 348/170

FOREIGN PATENT DOCUMENTS

| | | | | |
|---|---|---|---|---|
| CN | 1264057 | A | | 8/2000 |
| EP | 1024660 | A2 | * | 8/2000 |
| EP | 1128316 | A1 | * | 8/2001 |
| JP | 4-76698 | | | 3/1992 |
| JP | 06268902 | A | * | 9/1994 |
| JP | 11-316836 | | | 11/1999 |
| JP | 2000-76459 | | | 3/2000 |
| JP | 2003-92700 | | | 3/2003 |
| JP | 2003-107555 | | | 4/2003 |

* cited by examiner

IMAGE PROCESSOR AND FACE DETECTOR USING THE SAME

BACKGROUND OF THE INVENTION

1. Field of the Invention

The present invention relates an image processor for detecting an object from an image taken by a solid-state image sensing device such as CCD, and particularly a face detector using the image processor, which has the capability of detecting a face area as the object from the image taken against the sun, and providing a processed image of the face area with appropriate brightness.

2. Disclosure of the Prior Art

In recent years, a technique of detecting an object such as a human face from an image taken by an image pickup unit has advanced. For example, Japanese Patent Early Publication [kokai] No. 2003-92700 discloses a digital camera comprising an image pickup unit for converting a light signal provided from an image pickup area through an optical system into an image signal, and a face image detector for extracting only a face image from the image signal. To take a good picture of the human face, it is needed to push a shutter release button at an appropriate timing. In this camera, when the face image is extracted by the face image detector, the shutter release button is automatically pushed to carry out photographing. Therefore, it becomes easy to take the good picture even when an operator of the camera is a beginner.

However, when photographing against the sun, there is a case that the detection accuracy of the face image lowers due to a large difference in brightness between the object and the background. In the above-described digital camera, when a brightness of the entire area of the image is lower than a predetermined level, the photographing can be performed by irradiating a strobe light to the object, or adjusting exposure. These countermeasures are useful at the time of photographing, i.e., at the moment that the shutter release button was pushed. However, when the face image is not accurately detected by the face image detector due to poor lighting conditions, there is a fear that the image of a wrong object other than the human face is automatically taken by the image pickup unit.

SUMMARY OF THE INVENTION

Therefore, a primary concern of the present invention is to provide an image processor having the capability of detecting an object such as a human face with a high accuracy even under poor lighting conditions, and particularly when photographing against the sun.

That is, the image processor of the present invention comprises:
an image pickup unit configured to take an image of an object;
an image adjuster configured to adjust an image signal provided from the image pickup unit at an adjustment level;
an A/D converter configured to convert an output of the image adjuster into a digital image data;
an object detector configured to extract a feature of the object from the digital image data to detect an object area in the image; and
an adjustment-level controller for sending an adjustment-level control signal to the image adjuster in a feedback manner such that the image signal provided from the image pickup unit is adjusted at a different adjustment level when the object area is not detected by the object detector.

In the present invention, it is preferred that the adjustment level is at least one of an analog gain or a speed of an electronic shutter of the image pickup unit. The analog gain is a parameter for adjusting exposure. As higher the analog gain, a brightness of the image increases. In contrast to a digital treatment of adjusting color balance or tone curve, adjusting the analog gain is an analog treatment.

According to the present invention, the object can be accurately detected under various lighting conditions including backlighting by repeatedly performing the detection of the object area at different adjustment levels, preferably analog gains. Therefore, the present image processor is, for example, expected to be widely used as a security camera for checking suspicious persons in a structure such as airport terminal, into which sunlight penetrates, or an interphone with a monitor for checking a visitor at the door.

It is preferred that the image processor of the present invention further comprises a brightness adjuster for determining a brightness of the object area detected by the object detector, and allowing the adjustment-level controller to send to the image adjuster the adjustment-level control signal determined such that the brightness becomes a predetermined brightness. In this case, it is possible to provide a processed image of the object area with an optimum brightness.

It is also preferred that the adjustment-level controller determines the adjustment-level control signal by switching a first control period where the adjustment level is provided by a speed of an electronic shutter of the image pickup unit, and a second control period where the adjustment level is provided by an analog gain. In this case, it is possible to achieve an improvement in detection efficiently of the object area.

It is preferred that the image processor further comprises a brightness detector for detecting a brightness of an entire image pickup area taken by the image pickup unit, and the adjustment-level controller determines a change amount of the adjustment-level control signal according to the brightness.

As a preferred embodiment of the present image processor, the object detector comprises a reference-data memory for storing a template image of the object, and an object-area detecting portion for comparing the digital image data with the template image to calculate a degree of correlation therebetween, and determining an area having a higher degree of correlation than a threshold value as the object area. In this case, it is possible to further improve the detection accuracy.

In addition, it is preferred that the image processor further comprising an outline extracting unit for extracting an outline of the object, and the object detector detects the object area when the outline of the object is extracted by the outline extracting unit.

As a further preferred embodiment of the present invention, the image processor further comprises a light-source determining unit for determining whether a light source illuminating the object is the sun, and the object detector detects the object area when the light source is determined as the sun by the light-source determining unit. In this case, when the light source is not the sun, it is presumed that the photographing condition is not a poor lighting condition such as backlighting. Therefore, a processed image of the image pickup area with an adjusted brightness may be output without performing the detection of the object area. The object area can be easily identified from this processed image. Thus, by omitting the detection of the object area except for photographing out of doors in daylight, the detection efficiency can be further improved.

As another preferred embodiment of the present invention, the image sensor further comprises an illumination-intensity measuring unit for determining an illumination intensity of an image pickup area taken by the image pickup unit, and a light irradiating unit for irradiating an auxiliary light to the image pickup area when the illumination intensity is smaller than a predetermined value.

It is preferred that the adjustment-level controller sends to the image adjuster an initial adjustment-level control signal such that the image signal provided from the image pickup unit is initially adjusted at an initial adjustment level that is an intermediate value between maximum and minimum values of a changeable range of the adjustment level, and the adjustment-level controller determines the adjustment-level control signal from an adjustment-level control range set according to an average brightness of an entire area of the image adjusted at the initial adjustment level. In this case, it is possible to shorten time required to detect the object area.

Alternatively, it is also preferred that the adjustment-level controller sends to the image adjuster an initial adjustment-level control signal such that the image signal provided from the image pickup unit is initially adjusted at an initial adjustment level that is a maximum value of a changeable range of the adjustment level, and the adjustment-level controller determines the adjustment level control signal such that the adjustment level changes from the maximum value toward a minimum value of the changeable range in a step-by-step manner.

When a plurality of object areas are detected in the image by the object detector, it is preferred that the brightness adjuster determines the brightness of the object area having the largest area. In addition, it is preferred that the brightness adjuster determines an average brightness of the object areas, and the adjustment-level controller determines the adjustment-level control signal such that the average brightness becomes to a predetermined brightness. Alternatively, it is further preferred that the brightness adjuster assigns a weight to the brightness depending on size of the object area, and calculates a weighted average of the brightness, and the adjustment-level controller determines the adjustment-level control signal such that the weighted average becomes to a predetermined value.

As a particularly preferred application of the image processor of the present invention, a face detector is provided, which comprises:
an image pickup unit configured to take an image including a face as an object;
an image adjuster configured to adjust an image signal provided from the image pickup unit at an adjustment level that is at least one of an analog gain and a speed of an electronic shutter of the image pickup unit;
an A/D converter configured to convert an output of the image adjuster into a digital image data;
a face-area detector configured to extract a feature of the face from the digital image data to detect a face area in the image;
an adjustment-level controller for sending an adjustment-level control signal to the image adjuster in a feed-back manner such that the image signal provided from the image pickup unit is adjusted at a different adjustment level when the face area is not detected by the face-area detector; and
a brightness adjuster for determining a brightness of the face area detected by the face-area detector, and allowing the adjustment-level controller to send to the image adjuster the adjustment-level control signal determined such that the brightness becomes a predetermined brightness.

Additional features and advantages brought thereby will be clearly understood from the following detail explanation of the invention, referring to the attached drawings.

DETAILED DESCRIPTION OF THE INVENTION

As a preferred embodiment of the image processor of the present invention, a face detector is explained referring to the attached drawings.

First Embodiment

Figure 1:
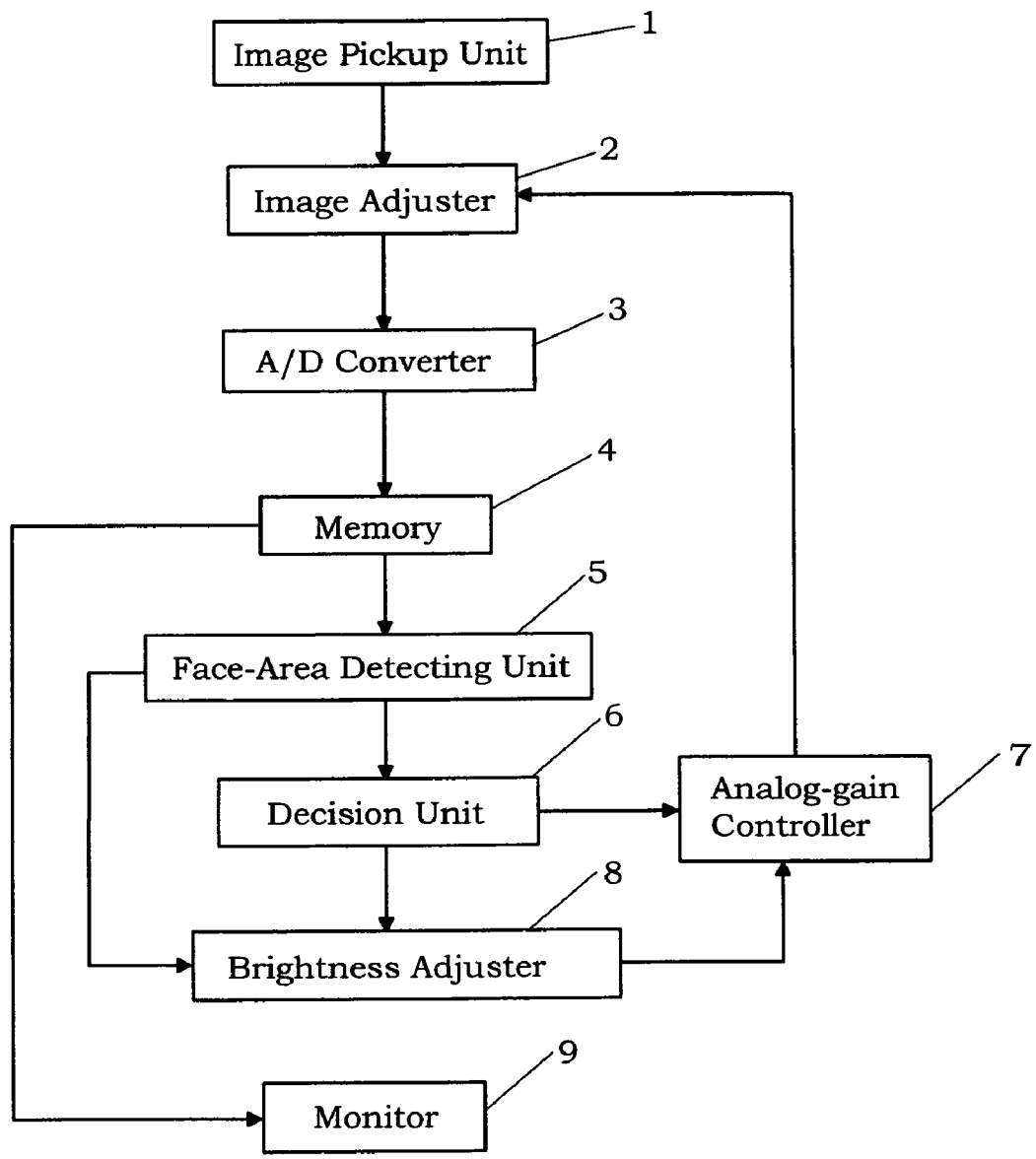
FIG. 1 is a block diagram of a face detector according to a first embodiment of the present invention.

As shown in FIG. 1, the face detector of this embodiment is mainly composed of a image pickup unit 1 formed by a solid-state image sensing device such as CCD camera, image adjuster 2 for adjusting (amplifying) an image signal provided from the image pickup unit 1 at an analog gain as an adjustment level, A/D converter 3 for converting an output of the image adjuster into a digital image data, memory 4 for storing the digital image data, face-area detecting unit 5 for performing a face-area detecting treatment, decision unit 6 for making a decision of the detection result, analog-gain controller 7 for sending an analog-gain control signal to the image adjuster in a feedback manner such that the image signal provided from the image pickup unit is adjusted at a different analog gain when the face-area detecting treatment did not have success, and a brightness adjuster 8 for determining a brightness of the face area detected by the face-area detecting unit, and allowing the analog-gain controller to send to the image adjuster the analog-gain control signal determined such that the brightness becomes a predetermined brightness, and a monitor 9 for displaying a processed image with adjusted brightness.

Figure 2:
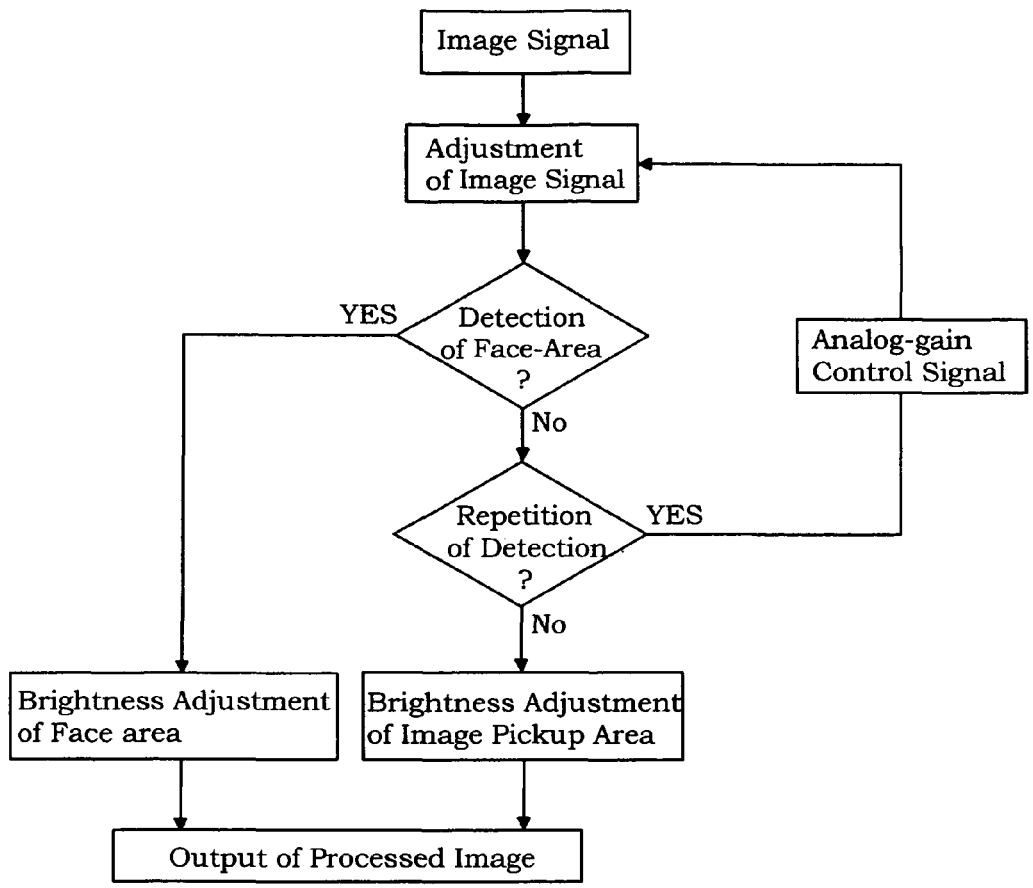
FIG. 2 is a flow chart showing an operation of the face detector of the first embodiment.

According to the face detector of the present embodiment, as shown in FIG. 2, the image pickup unit 1 outputs as electrical signal as the image signal by a photoelectric transfer of an incident light from an image pickup area. In the image adjuster 2, an amplitude or an offset of the image signal is adjusted at an analog gain, which can be changed by the analog-gain control signal. In this embodiment, the analog-gain controller 7 sends an initial analog-gain control signal to the image adjuster 2, so that the image signal provided from the image pickup unit 1 is adjusted (amplified) at the analog gain determined by the initial analog-gain control signal. Subsequently, the image signal is converted into the digital image data by the A/D converter 3, and stored in the memory 4.

With respect to the digital image data stored in the memory 4, the face-area detecting unit 5 extracts a feature amount of a human face as the object from the digital image data to detect the face area in the image according to a (concentration) pattern matching method. In this embodiment, the face-area detecting unit has a reference-data memory for storing a template image of the human face (e.g., a monochrome image of a normal human face), and compares the digital image data read out from the memory 4 at a required timing with the template image to calculate a degree of correlation therebetween at respective positions of the image, so that an area having a higher degree of correlation than a threshold value is determined as the face area. When there is a large difference in brightness between the template image and the digital image data, a normalized correlation treatment may be performed. In place of the above pattern matching method, a graph matching method using a positional relation between the features such as eyes, mouse and nose of the face may be performed.

When the face area is detected by the face-area detecting unit 5, the digital image data of the face area is sent to the brightness adjuster 8, and an average brightness of the detected face area is calculated. This average brightness is then adjusted to an appropriate brightness. That is, the analog-gain controller 7 sends to the image adjuster the analog-gain control signal for adjusting the average brightness of the face area calculated by the brightness adjuster 8 to the appropriate brightness, so that the image signal provided from the image pickup unit 1 is adjusted at the analog gain determined by the analog-gain control signal. Finally, a processed image of the face area with the appropriate brightness is output, and displayed on the monitor 9.

On the other hand, when the face area is not detected by the face-area detecting unit 5, the decision unit 6 checks whether the current face-area detecting treatment satisfies a required condition. For example, the decision unit 6 checks whether the face-area detecting treatment has been completed with respect to the image signals adjusted at all of analog gains in an analog-gain control range predetermined by the analog-gain controller. Alternatively, the decision unit 6 may count the repetition number of the face-area detecting treatment, and check whether the counted number is smaller than a predetermined number. For example, when it is decided that the face-area detecting treatment has not been completed yet, the analog-gain controller 7 sends the analog-gain control signal to the image adjuster 2, so that the image signal provided from the image pickup unit 1 is adjusted at a different analog gain. Thus, the face-area detecting treatment is repeated at different analog gains until it is completed with respect to the image signals adjusted at all of analog gains in the analog-gain control range. When the face area is detected, the average brightness of the face area is adjusted, as described above, and the processed image of the face area with the appropriate brightness is displayed on the monitor 9.

On the other hand, when it is decided that the face-area detecting treatment has been completed, the digital image data of the entire image pickup area is sent to the brightness adjuster 8, and an average brightness of the entire image pickup area is calculated. This average brightness is adjusted to an appropriate brightness. That is, the analog-gain controller 7 sends to the image adjuster 2 the analog-gain control signal for adjusting the average brightness of the entire image pickup area calculated by the brightness adjuster to the appropriate brightness, so that the image signal provided from the image pickup unit 1 is adjusted at the analog gain determined by the analog-gain control signal. Consequently, a processed image of the entire image pickup area with the appropriate brightness is output, and displayed on the monitor 9. Thus, when the detection of the face area is impossible from some reason, for example, the absence of the face in the image, the face detector simply provides the processed image of the image pickup area with adjusted brightness.

Figure 3A:
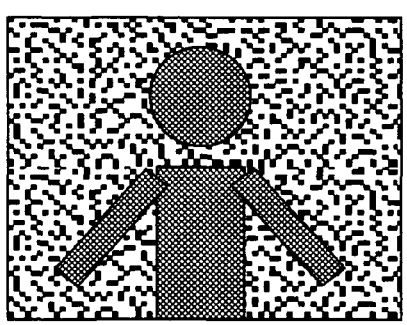
FIGS. 3A and 3B are explanatory diagrams showing an unprocessed image taken against the sun, and a processed image displayed on a monitor of the face detector.
Figure 3B:
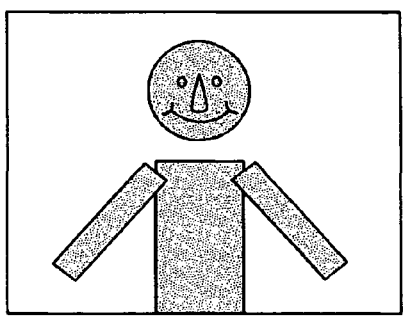

Thus, by repeating the face-area detecting treatment, while changing the analog gain for adjusting the image signal in a feedback manner, the face area can be extracted with a high degree of reliability regardless of lighting conditions when the face exists in the image taken by the image pickup unit 1. Particularly, in the case of photographing under a large difference in brightness between the face area and the background, e.g., photographing against the sun, the face area becomes dark, as shown in FIG. 3A, when a conventional automatic exposure is used. However, according to the above-described face detector of the present invention, the processed image of the face area with appropriate brightness can be displayed on the monitor 9, as shown in FIG. 3B.

In the above face detector, it is preferred that the analog-gain controller 7 determines the analog gain control signal according to the following method. That is, the initial analog-gain control signal sent to the image adjuster 2 by the analog gain controller 7 is determined such that the image signal provided from the image pickup unit 1 is initially adjusted at an initial analog gain that is a maximum value of a changeable range of the analog gain. When the face area is not detected from the image signal adjusted at the initial analog gain, the decision unit 6 checks whether the analog gain used in the current face-area detecting treatment is a minimum value of the changeable range. Since the initial analog gain is greater than the minimum value, the analog-gain controller 7 determines the analog-gain control signal such that the image signal provided from the image pickup unit 1 is adjusted at a different analog gain that is smaller than the initial analog gain by a required magnitude. Thus, the face-area detecting treatment is repeated by use of different analog gains unless the analog gain used in the face-area detecting treatment is the minimum value. In brief, the analog-gain controller 7 determines the analog-gain control signal such that the analog gain decreases from the maximum value toward the minimum value every face-area detecting treatment in a step-by-step manner. In this case, since the image changes from bright to dark, it is possible to reduce a feeling of strangeness of the user seeing the image on the display 9. As a modification, the analog-gain controller 7 may determine the analog-gain control signal such that the initial analog gain is the minimum value of the changeable range of the analog gain, and the analog gain sequentially increases from the minimum value to the maximum value every face-area detecting treatment.

In addition, the analog gain controller 7 preferably determines a change amount of the analog gain, which is defined as a difference in analog gain between successively performed two face-area detecting treatments, depending on average brightness of the entire area of the image taken by the image pickup unit 1. For example, when the average brightness is in a high range (e.g., backlighting), a small change amount of the analog gain is suitable to improve the detection accuracy of the face area. When the average brightness is in a middle range, a large change amount of the analog gain is suitable to increase the detection speed of the face area. In addition, when the average brightness is in a low range, it is preferred to set a moderate change amount of the analog gain, which is larger than the case of the high range and smaller than the case of the middle range of the average brightness.

Second Embodiment

Figure 4:
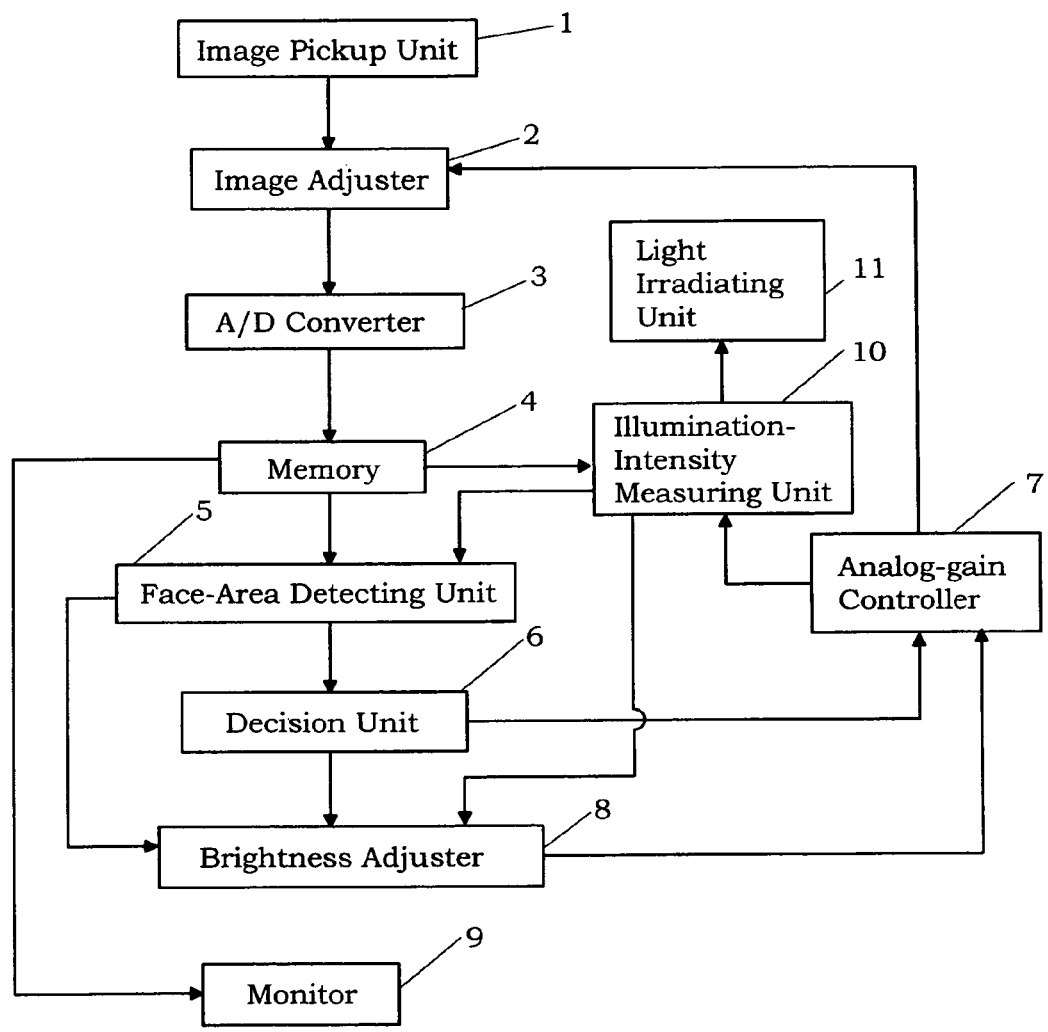
FIG. 4 is a block diagram of a face detector according to a second embodiment of the present invention.

A face detector of this embodiment is substantially the same as the face detector of the first embodiment except for further comprising an illumination-intensity measuring unit 10 for determining an illumination intensity of an image pickup area, and a light irradiating unit 11 for irradiating an auxiliary light such as infrared light to the image pickup area when the illumination intensity is smaller than a predetermined value, as shown in FIG. 4. Therefore, duplicate explanations are omitted.

Figure 5:
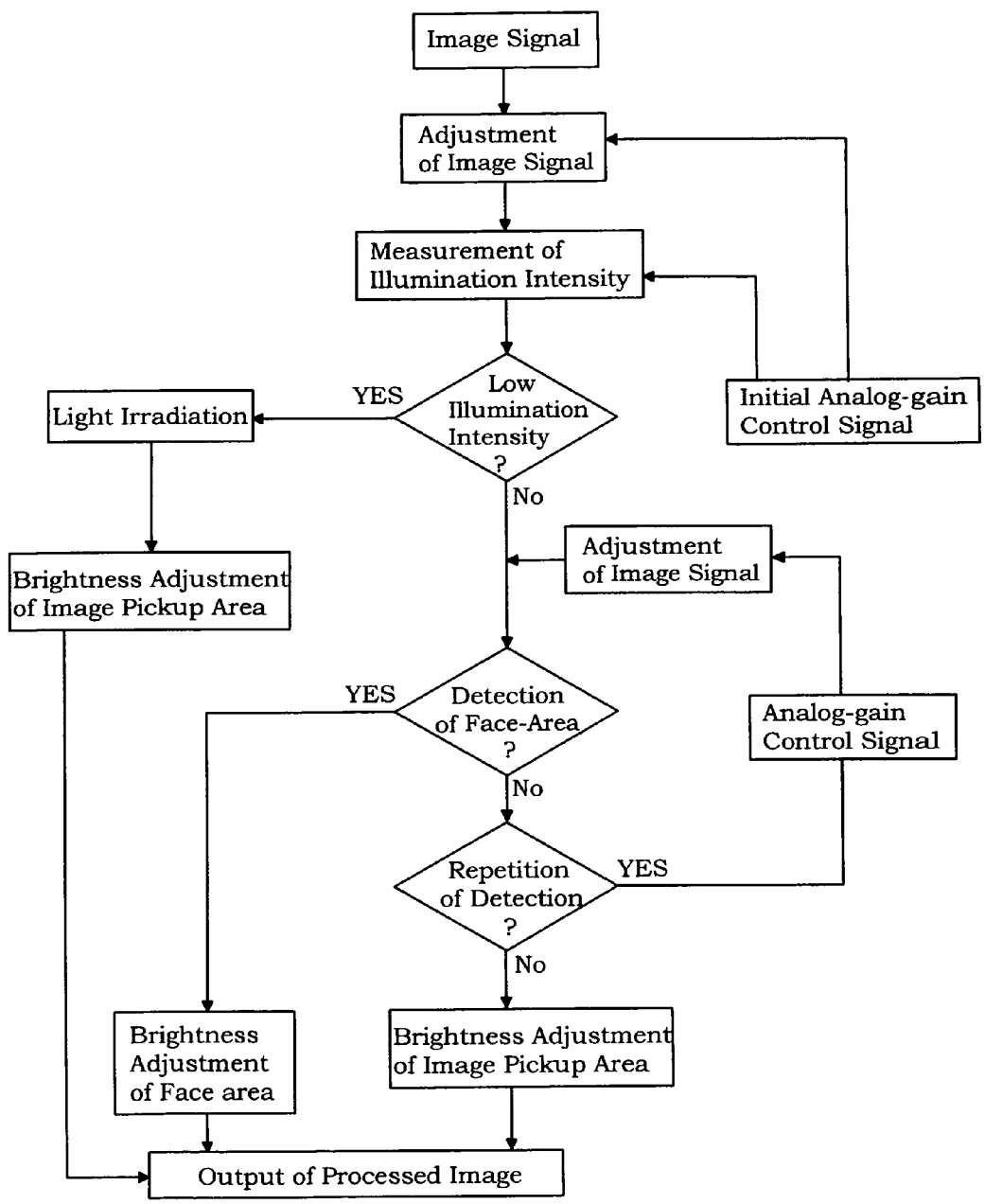
FIG. 5 is a flow chart showing an operation of the face detector of the second embodiment.

In the face detector of the present embodiment, as shown in FIG. 5, the analog-gain controller 7 sends to the image adjuster 2 an initial analog-gain control signal determined such that the image signal provided from the image pickup unit 1 is firstly adjusted (amplified) at a maximum analog gain available in the image adjuster. The adjusted image signal is converted into a digital image data by the A/D converter 3, and stored in the memory 4. Then, the illumination-intensity measuring unit 10 determines the illumination intensity of the image pickup area according to the analog gain set by the analog-gain controller 7 and the digital image data stored in the memory 4, and checks whether the illumination intensity is lower than a predetermined value.

When the illumination intensity is lower than the predetermined value, the light irradiating unit 11 such as an infrared LED is turned on to irradiate the infrared light to the image pickup area. The image is taken by the image pickup unit 1 under the irradiation of the infrared light, and then adjusted (amplified) at a required analog gain. The adjusted image is converted into digital image data by the A/D converter 3, and stored in the memory 4. Subsequently, the digital image data is directly sent to the brightness adjuster 8 not through the face-area detecting unit 5. In the brightness adjuster 8, an average brightness of the image pickup area of the digital image data is calculated. The analog gain controller 7 sends to the image adjuster the analog-gain control signal to adjust the average brightness to an appropriate brightness. Consequently, a processed image of the image pickup area with the appropriate brightness is displayed on the monitor 9. In the image taken by the image pickup unit 1 under the irradiation of the auxiliary light, a difference in brightness between the face area and the background is sufficiently small. Therefore, the face area can be easily identified from the processed image of the image pickup area with the appropriate brightness.

When the illumination intensity is not lower than the predetermined value, the face-area detecting treatment is performed as in the case of the first embodiment. That is, when the face area is detected, a processed image of the face area with an appropriate brightness is displayed on the monitor 9. When the face area is not detected, the decision unit 6 checks whether the analog gain used in the face-area detecting treatment is the minimum analog gain. When the analog gain is not the minimum analog gain, the analog-gain controller 7 sends to the image adjuster 2 the analog gain control signal such that the image signal provided from the image pickup unit 1 is adjusted at a different analog gain. The face-area detecting treatment is repeated to detect the face area by use of different analog gains unless the analog gain is the minimum analog gain. When the analog gain is the minimum analog gain, the repetition of the face-area detecting treatment is stopped, so that the processed image of the image pickup area with the appropriate brightness is displayed on the monitor 9.

In place of the infrared LED, a white LED may be used as the light irradiating unit 11. In addition, a slow-shutter mechanism for controlling the speed of the electronic shutter of the image pickup unit 1 may be used in place of the light irradiation. Alternatively, both of the slow-shutter mechanism and the light irradiating unit 11 may be used.

Figure 6:
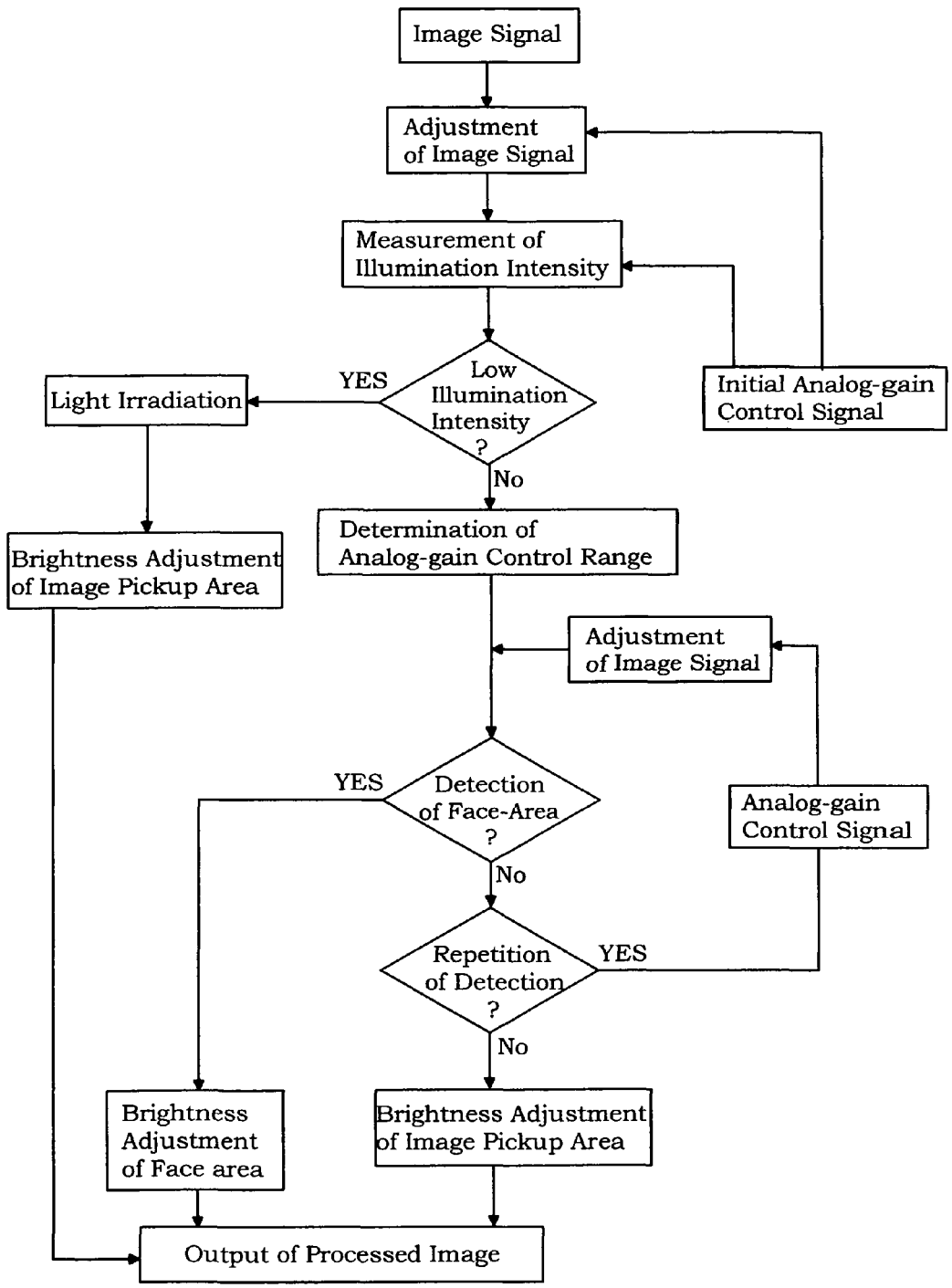
FIG. 6 is a flow chart showing an operation of the face detector according to a modification of the second embodiment.

As a modification of the second embodiment, the analog gain controller 7 may send to the image adjuster 2 the initial analog-gain control signal such that the image signal provided from the image pickup unit 1 is initially adjusted at an initial analog gain that is an substantially intermediate value between maximum and minimum values of a changeable range of the analog gain. In this case, as shown in FIG. 6, when the illumination intensity is not lower than the predetermined value, the analog-gain controller 7 also determines a control range of the analog gain suitable to efficiently detect the face area from the available range of the analog gain of the image adjuster 2 according to average brightness of the entire image pickup area.

The control range of the analog gain is defined at both of upper and lower sides of the initial analog gain. When the average brightness is higher than a reference value, a wide analog-gain control range is preferably set because a distribution of brightness in the image pickup area is wide. When the average brightness is not higher than the reference value, a narrow analog-gain control range is preferably set. In this modification, when the face-area detecting treatment is repeated, the analog gain is increased or decreased from the initial analog gain in the control range of the analog gain. Therefore, there is an advantage of relatively reducing the change amount of the analog gain needed to detect the face area. When the illumination intensity is lower than the predetermined value, the processed image obtained without the face-area detecting treatment is displayed on the monitor 9, as in the case of the second embodiment.

Third Embodiment

Figure 7:
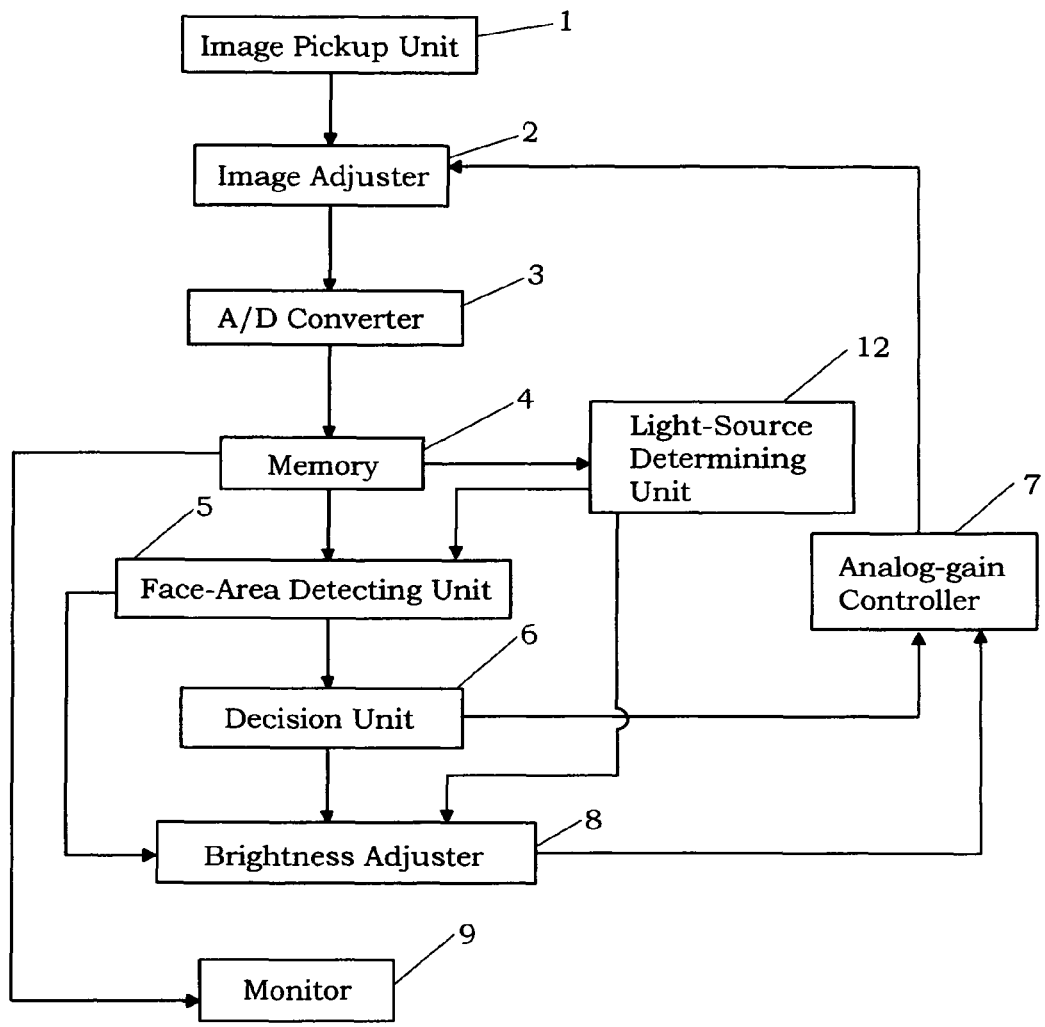
FIG. 7 is a block diagram of a face detector according to a third embodiment of the present invention.

A face detector of the present embodiment is substantially the same as the face detector of the first embodiment except for further comprising a light-source determining unit 12 for determining whether a light source illuminating the image pickup area is the sun, as shown in FIG. 7. Therefore, duplicate explanations are omitted. A color temperature of the sunlight is in a range of 5000 to 6000 K. On the other hand, the color temperature of a tungsten-filament lamp is in a range of 2800 to 3200 K. Therefore, it is possible to determine whether the light source is the sun by detecting the color temperature.

Figure 8:
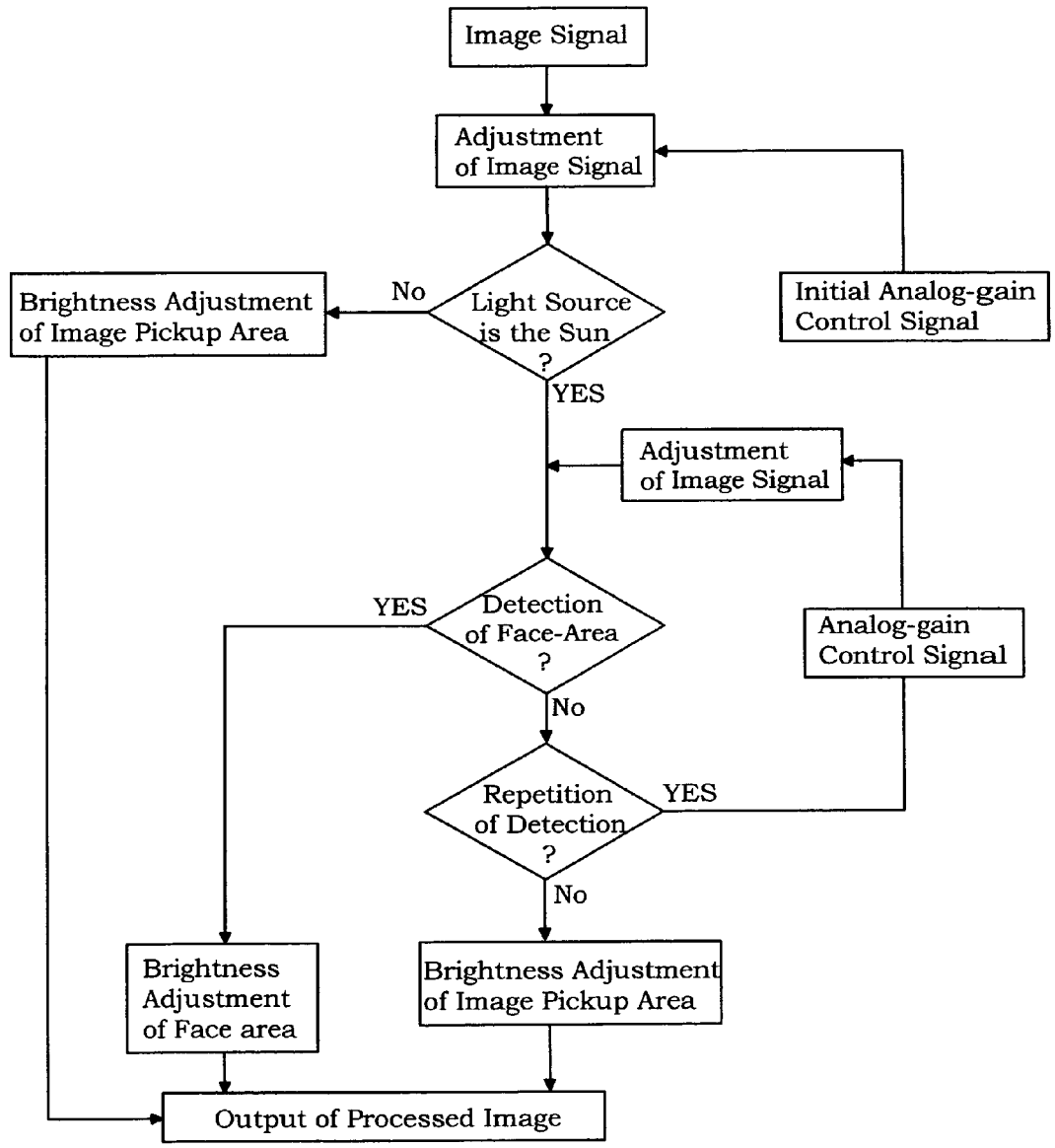
FIG. 8 is a flow chart showing an operation of the face detector of the third embodiment.

In the present embodiment, as shown in FIG. 8, the analog-gain controller 7 sends to the image adjuster 2 an initial analog-gain control signal such that the image signal provided from the image pickup unit 1 is initially adjusted (amplified) at a maximum analog gain available in the image adjuster. The adjusted image signal is converted into a digital image data by the A/D converter 3, and stored in the memory 4. Then, the light-source determining unit 12 makes a decision whether the light source is the sun by detecting the color temperature from the digital image data stored in the memory.

In the decision that the light source is the sun, the face-area detecting treatment is performed, as in the case of the first embodiment. In the decision that the light source is not the sun, the average brightness of the image pickup area is calculated without performing the face-area detecting treatment. Consequently, a processed image of the image pickup area with an appropriate brightness is displayed on the monitor 9. The occurrence of a dark face area in the image often happens when the light source is the sun. Therefore, when the light source is not the sun, it is presumed that a difference in brightness between the face area and the background is relatively small. Consequently, the face area can be easily identified from the processed image obtained by simply adjusting the brightness of the image pickup area without the face-area detecting treatment. In addition, since the face-area detecting treatment is performed only when the light source is the sun, the treatment efficiency of the face detector can be improved.

Fourth Embodiment

A face detector of the present embodiment is substantially the same as the face detector of the first embodiment except for further comprising an outline extracting unit (not shown) for extracting an outline of the face as the object prior to the face-area detecting treatment. Therefore, duplicate explanations are omitted.

Figure 9:
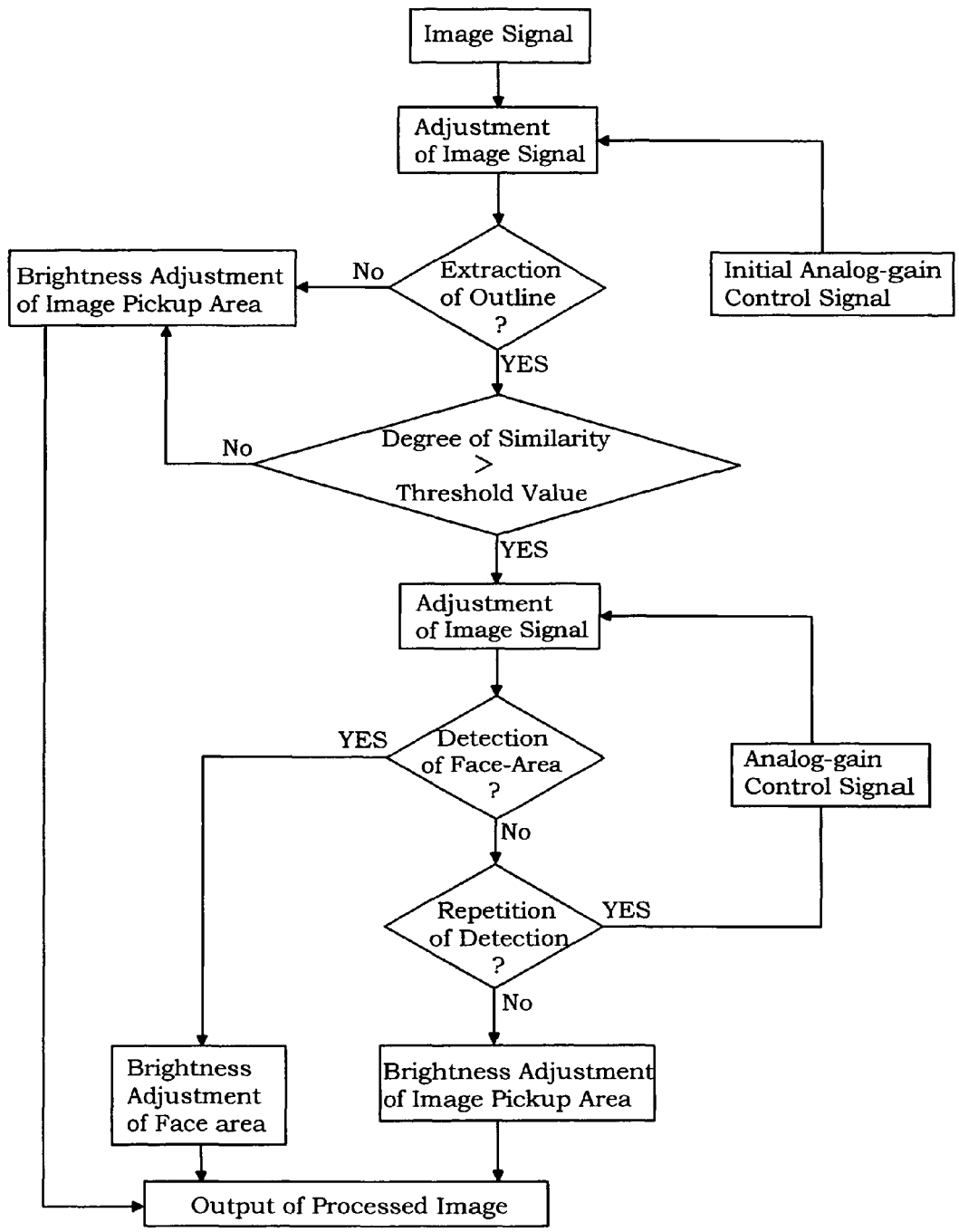
FIG. 9 is a flow chart showing an operation of a face detector of the fourth embodiment.

In the present embodiment, as shown in FIG. 9, the analog-gain controller 7 sends to the image adjuster 2 an initial analog-gain control signal such that the image signal provided from the image pickup unit 1 is adjusted (amplified) at a predetermined analog gain. An output of the image adjuster is converted into a digital image data by the A/D converter 3, and then stored in the memory 4. Next, an average brightness of the image pickup area is calculated from the digital image data read out from the memory 4. The analog-gain controller 7 sends to the image adjuster 2 the analog-gain control signal to adjust the average brightness to a desired brightness, so that the image signal provided from the image pickup unit 1 is adjusted at the analog gain determined by this analog-gain control signal. The output of the image adjuster is converted into the digital image data of the image pickup area with the desired brightness by the A/D converter 3, and stored in the memory 4.

Next, with respect to the digital image data of the image pickup area with the desired brightness, an outline extracting treatment is performed by use of a differential filter such as a Sobel operator as the outline extracting unit. When the outline of a face is extracted, it is compared with template images of standard human faces to determine a degree of similarity therebetween. The degree of similarity is then compared with the a threshold value. When the degree of similarity is greater than the threshold value, there is a high possibility that the extracted outline is the outline of the face. Therefore, the information of the extracted outline is sent to the brightness adjuster 8 as a face-outline candidate, and then an average brightness of the face-outline candidate is calculated. Then, the analog-gain controller 7 sends to the image adjuster 2 the analog-gain control signal to adjust the average brightness to an appropriate brightness, so that the image signal provided from the image pickup unit 1 is adjusted (amplified) at the analog gain determined by the analog-gain control signal. The output of the image adjuster 2 is converted into the digital image data of the face-outline candidate with the appropriate brightness by the A/D converter 3, and stored in the memory 4.

Next, with respect to the digital image data of the face-outline candidate with the appropriate brightness, the face-area detecting treatment is performed according to the (concentration) pattern matching method, as in the case of the first embodiment. When the face area is detected, an average brightness of the face area is calculated, and then adjusted to an appropriate brightness. As a result, a processed image of the face area with the appropriate brightness is displayed on the monitor 9. On the other hand, when the face area is not detected, the face-area detecting treatment is repeatedly performed by use of different analog gains to detect the face area. When the outline of the face is not extracted, the degree of the similarity is not greater than the threshold value, or the face area is not finally detected by the face-area detecting treatment, a processed image of the image pickup area with an appropriate brightness is displayed on the monitor 9.

According to the present embodiment, since the face-area detecting treatment is performed after the face-outline candidate obtained by the outline extracting treatment is adjusted at the appropriate brightness, the feature amount of the face is easily extracted in the face-area detecting treatment. In addition, when only the outline extracting treatment is performed, there is a fear that a shape similar to the face outline is recognized as the face outline by mistake. However, according to the present embodiment, since the feature amount of the face is extracted by the face-area detecting treatment after the outline extracting treatment, it is possible to prevent such a false recognition, and provide the face detector with a high degree of reliability.

Fifth Embodiment

A face detector of the present embodiment is substantially the same as the face detector of the first embodiment except that the face detector further comprises a counting memory (not shown) for counting and storing the number of times the face-area detecting treatment has had success in a required time period, and the decision unit 6 also checks whether the counted number of times is zero. Therefore, duplicate explanations are omitted.

To facilitate the understanding of the present embodiment, the following explanation is based on the assumption that the number of times the face-area detecting treatment has had success is "1". As in the case of the first embodiment, the image signal provided from the image pickup unit 1 is adjusted (amplified) at an analog gain by the image adjuster 2. The output of the image adjuster is converted into the digital image data by the A/D converter 3, and stored in the memory 4. Next, with respect to the digital image data read out from the memory 4, the face-area detecting treatment is performed according to the (concentration) pattern matching method. When the face area is detected, the average brightness of the face area is calculated, and the analog-gain controller 7 sends to the image adjuster 2 the analog-gain control signal to adjust the average brightness to an appropriate brightness. As a result, a processed image of the face area with the appropriate brightness is displayed on the monitor 9. At this time, the counting memory stores "2" as the number of times the face-area detecting treatment has had success.

Figure 10:
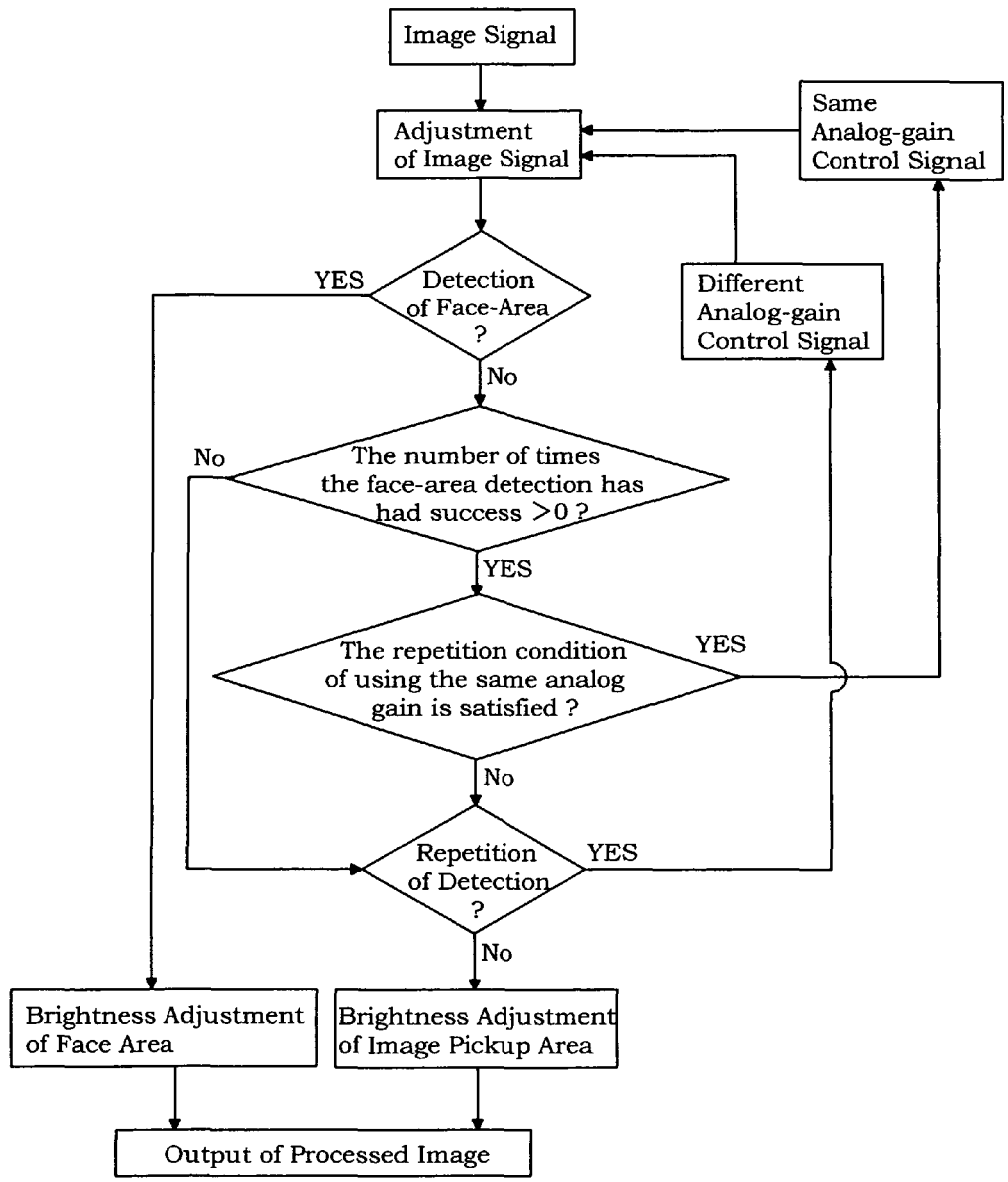
FIG. 10 is a flow chart showing an operation of a face detector of the fifth embodiment.

As shown in FIG. 10, when the face area is not detected by the face-area detecting treatment, the decision unit 6 checks whether the number of times the face-area detecting treatment has had success is greater than zero. As described above, since the number of times is "1" in this explanation, the analog-gain controller 7 send to the image adjuster 2 the analog-gain control signal such that the image signal provided from the image pickup unit 1 is adjusted at the same analog gain used when the face-area detecting treatment has had success. For example, when the face (the object) temporarily disappears from the image pickup area, the face-area detecting unit 5 can not detect the face area in the image. In addition, when a large change in brightness occurs, there is a fear that the face area is not detected by the face-area detecting unit 5. However, in this embodiment, since the face-area detecting treatment has had success once, there is a high possibility that when the face appears again the image pickup area, the face area is detected by the face-area detecting treatment with the same analog gain used when the face-area detecting treatment has had success. Therefore, it is possible to prevent an inconvenience that the face-area detecting treatment starts again from the beginning, and efficiently detect the face area.

In addition, as the number of times the face-area detecting treatment has had success increases, the reliability of the analog gain becomes higher. Therefore, it is preferred that the repetition number of the face-area detecting treatment using the same analog gain is determined depending on the number of times the face-area detecting treatment has had success. Alternatively, the repetition number may be determined according to time required for the previous success of the face-area detection. When the number of times the face-area detecting treatment has had success is zero, the face-area detecting treatment is repeatedly performed by use of different analog gains, as in the case of the first embodiment. In addition, when the face area is not detected by repeating the face-area detecting treatment using the same analog gain at the required times, the face-area detecting treatment starts again from the beginning.

In the above embodiments, when a plurality of face areas are detected in the image by the face-area detecting unit 5, it is preferred that the brightness adjuster 8 determines the average brightness of the face area having the largest area because it is regarded that the face area having the largest area is located at the closest position to the image pickup unit 1. Alternatively, the brightness adjuster 8 may determine average brightness of those face areas. In this case, the analog-gain controller 7 sends to the image adjuster 2 the analog-gain control signal to adjust the average brightness to a n appropriate brightness. In addition, the brightness adjuster 8 may assign a weight to the brightness depending on size of the face area, and calculate a weighted average of the brightness. For example, a greater weight is assigned to the brightness of the larger face area. In this case, the analog-gain controller 7 sends to the image adjuster 2 the analog-gain control signal to adjust the weighted average to a predetermined value.

In place of the analog gain, a speed of an electronic shutter of the image pickup unit 1 may be used as the adjustment level. In this case, the image adjuster 2 performs an adjustment of the image signal provided from the image pickup unit 1 by controlling the speed of the electronic shutter. In addition, when the face area is not detected by the face-area detecting unit 5, a shutter speed controller used as an adjustment-level controller sends a shutter-speed control signal to the image adjuster 2.

In place of the analog-gain controller 7, it is also preferred to use an adjustment-level controller, which determines the adjustment-level control signal to be sent to the image adjuster 2 by switching a shutter-speed control period where the speed of the electronic shutter of the image pickup unit 1 is used as the adjustment level, and an analog-gain control period where the analog gain is used as the adjustment level. For example, the speed of the electronic shutter is preferably used when repeatedly performing the face-area detecting treatment, while changing the adjustment level by a relatively large change amount. On the contrary, the analog gain is preferably used when repeatedly performing the face-area detecting treatment, while changing the adjustment level by a relatively small change amount.

In place of calculating the average brightness, an average of color signal or color-difference signal may be calculated. In addition, when calculating the average brightness, a weighting treatment may be performed by using a photometric pattern where a weight is assigned to a center portion of the face-area or the image pickup area.

As described above, the primary concern of the present invention provides the image processor, preferably the face detector. In addition, the present invention can be understood as an image processing method comprising the steps of taking an image of an object by an image pickup unit, adjusting an image signal provided from the image pickup unit at an adjustment level by an image adjuster, converting an output of the image adjuster into a digital image data, and extracting a feature of the object from the digital image data to detect an object area in the image, and characterized in that when the object area is not detected, an adjustment-level control signal is sent to the image adjuster in a feedback manner such that the image signal provided from the image pickup unit is adjusted at a different adjustment level.

As a particularly preferred embodiment of the above image processing method, a face detecting method of the present invention comprises the steps of taking an image including a face as the object by an image pickup unit, adjusting the image signal provided from the image pickup unit at an adjustment level that is at least one of an analog gain and a speed of an electronic shutter of the image pickup unit by an image adjuster, converting an output of the image adjuster into a digital image data, and extracting a feature of the face from the digital image data to detect a face area in the image, and determining a brightness of the detected face area, and characterized in that when the face area is not detected, an adjustment-level control signal is sent to the image adjuster in a feedback manner such that the image signal provided from the image pickup unit is adjusted at a different adjustment level, and when the brightness of the detected face area is determined, the adjustment-level control signal is sent is sent to the image adjuster to adjust the brightness to a predetermined brightness.

What is claimed is:

1. An image processor comprising:

image pickup means configured to take an image of an object;

an image adjuster configured to adjust an image signal provided from said image pickup means at an adjustment level;

an A/D converter configured to convert an output of said image adjuster into a digital image data;

an object detector configured to extract a feature of said object from said digital image data to detect an object area in the image;

an adjustment-level controller for sending an adjustment-level control signal to said image adjuster in a feedback manner such that the image signal provided from said image pickup means is adjusted at a different adjustment level when the object area is not detected by said object detector; and a brightness detector for detecting a brightness of an entire image pickup area taken by said image pickup unit, wherein said adjustment-level controller determines a change amount of the adjustment-level control signal according to the brightness detected by said brightness detector, wherein said adjustment-level controller is configured to make the change amount of the adjustment level smaller when said brightness detected by said brightness detector is above a predetermined value than when the detected brightness level is below the predetermined value, wherein said adjustment-level controller sends to said image adjuster an initial adjustment-level control signal such that the image signal provide from said image pickup means is initially adjusted at an initial adjustment level that is a maximum value of a changeable range of said adjustment level, and wherein said adjustment-level controller determines the adjustment level control signal such that the adjustment level changes from the maximum value toward a minimum value of the changeable range in a step-by-step manner.

2. The image processor as set forth in claim 1 further comprising a brightness adjuster for determining a brightness of the object area detected by said object detector, and allowing said adjustment-level controller to send to said image adjuster the adjustment-level control signal determined such that the brightness becomes a predetermined brightness.

3. The image processor as set forth in claim 1, wherein the adjustment level is provided by an analog gain.

4. The image processor as set forth in claim 1, wherein the adjustment level is provided by a speed of an electronic shutter of said image pickup means.

5. The image processor as set forth in claim 1, wherein said adjustment-level controller determines the adjustment-level control signal by switching a first control period where the adjustment level is provided by a speed of an electronic shutter of said image pickup means, and a second control period where the adjustment level is provided by an analog gain.

6. The image processor as set forth in claim 1, wherein said object detector extracts a face as the feature of said object from said digital image signal to detect a face area as said object area.

7. The image processor as set forth in claim 1, wherein said object detector comprises a reference-data memory for storing a template image of said object, and an object-area detecting portion for comparing said digital image data with said template image to calculate a degree of correlation therebetween, and determining an area having a higher degree of correlation than a threshold value as said object area.

8. The image processor as set forth in claim 1 further comprising outline extracting means for extracting an outline of said object, and wherein said object detector detects the object area when the outline of said object is extracted by said outline extracting means.

9. The image processor as set forth in claim 1 further comprising light-source determining means for determining whether a light source illuminating said object is the sun, and said object detector detects the object area when the light source is determined as the sun by said light-source determining means.

10. The image processor as set forth in claim 1, further comprising illumination-intensity measuring means for determining an illumination intensity of an image pickup area taken by said image pickup means, and light irradiating means for irradiating an auxiliary light to the image pickup area when the illumination intensity is smaller than a predetermined value.

11. The image processor as set forth in claim 1, wherein said adjustment-level controller sends to said image adjuster an initial adjustment-level control signal such that the image signal provided from said image pickup means is initially adjusted at an initial adjustment level that is an intermediate value between maximum and minimum values of a changeable range of said adjustment level, and wherein said adjustment-level controller determines the adjustment-level control signal from an adjustment-level control range set according to an average brightness of an entire area of the image adjusted at the initial adjustment level.

12. The image processor as set forth in claim 1, wherein said brightness detector is configured to give an average brightness of the entire image pickup area.

13. An image processor comprising:
image pickup means being configured to take an image pickup area in order to take an image of an object of the image pickup area, and to generate an image signal from the image pickup area;
an image adjuster configured to adjust the image signal provided from said image pickup means at an adjustment level;
an A/D converter configured to convert an output of said image adjuster into a digital image data;
an object detector configured to perform an object detecting treatment of extracting a feature of said object from the digital image data in order to detect an object area in the digital image data;
a brightness adjuster configured to determine a brightness of the object area detected by said object detector when said object detector detects the object area;
an adjustment-level controller configured to determine a first adjustment level control signal on the basis of the brightness of the object area, and configured to send the first adjustment level control signal to said image adjuster in a feedback manner so that the image adjuster adjusts the image signal at a first adjustment level determined by the first adjustment level control signal;
a brightness detector configured to detect a brightness of an entire the image pickup area taken by said image pickup means,
wherein
the image processor further comprises a decision unit, said decision unit being configured to check whether the object detector satisfies a completed condition or an uncompleted condition when the object detector detects no object area in the digital image data, said completed condition being defined by a condition where the object detecting treatment is completed, said uncompleted condition being defined by a condition where the object detecting treatment is not completed,
said adjustment-level controller being configured to generate a predetermined adjustment level control signal when the decision unit detects the uncompleted condition, said adjustment-level controller being configured to send the predetermined adjustment level control signal to said image adjuster, said image adjuster being configured to adjust the image signal at a predetermined adjustment level which is determined by the predetermined adjustment level control signal,
said brightness detector being configured to calculate an average brightness of the entire the image pickup area when the decision unit detects the completed condition, said adjustment-level controller being configured to generate a second adjustment level control signal, and to send the second adjustment level control signal to said image adjuster, said image adjuster being configured to adjust the image signal at a second adjustment level which is determined by the second adjustment level control signal.

* * * * *

UNITED STATES PATENT AND TRADEMARK OFFICE
CERTIFICATE OF CORRECTION

| | | |
|---|---|---|
| PATENT NO. | : 7,948,524 B2 | Page 1 of 1 |
| APPLICATION NO. | : 11/097187 | |
| DATED | : May 24, 2011 | |
| INVENTOR(S) | : Junpei Endo et al. | |

It is certified that error appears in the above-identified patent and that said Letters Patent is hereby corrected as shown below:

Title Page;

(57) Abstract, line 5, change "out" to -- output --

(57) Abstract, line 6, after "a digital" insert -- image data --

(57) Abstract, line 9, after "gain controller sends" insert -- an analog-gain control signal to the image adjuster in a feedback manner such --

Column 12, line 26, after "control signal is sent" delete "is sent"

Signed and Sealed this
Ninth Day of August, 2011

David J. Kappos
*Director of the United States Patent and Trademark Office*